July 7, 1964 V. L. BARR 3,140,130
KEYED SEGMENTED RACE RINGS AND IMPROVED METHOD OF MAKING SAME
Filed Aug. 9, 1961
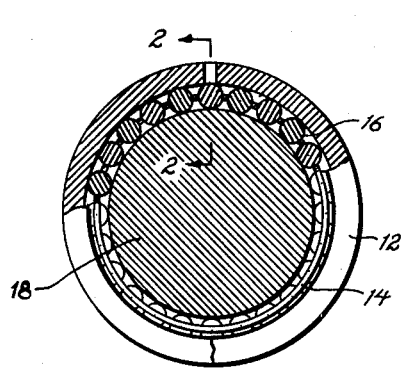
Fig. 1.
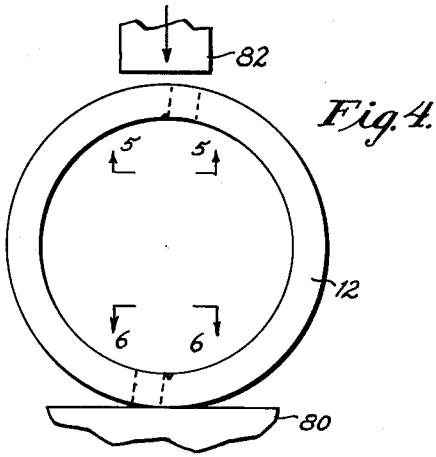
Fig. 4.
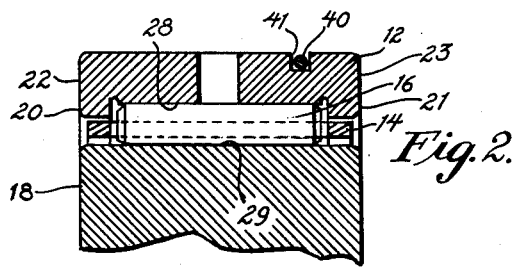
Fig. 2.
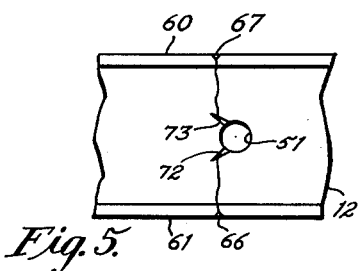
Fig. 5.
Fig. 6.
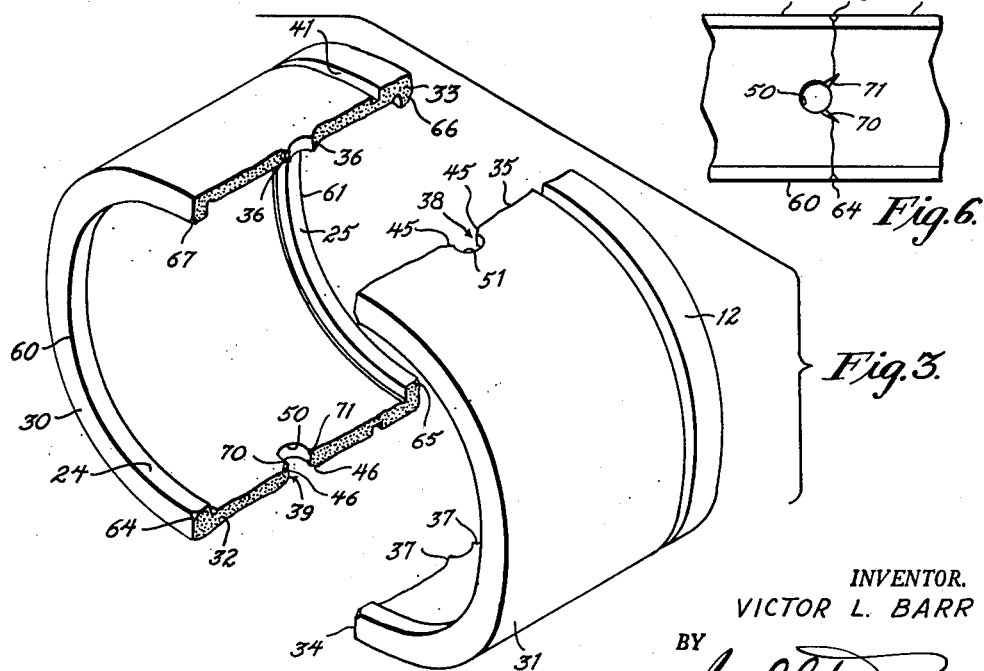
Fig. 3.
INVENTOR.
VICTOR L. BARR
BY
HIS ATTORNEY

United States Patent Office 3,140,130
Patented July 7, 1964

3,140,130
KEYED SEGMENTED RACE RINGS AND IMPROVED METHOD OF MAKING SAME
Victor L. Barr, Philadelphia, Pa., assignor to Roller Bearing Company of America, Trenton, N.J., a corporation of New Jersey
Filed Aug. 9, 1961, Ser. No. 130,381
1 Claim. (Cl. 308—216)

This invention relates to improved segmented race rings for roller bearings and to improved methods for forming a race ring to provide a keying arrangement between abutting segment end portions.

In certain instances, where roller bearings with segmented race rings are utilized, the race rings are subjected to axial forces which tend to move the race ring segments axially relative to each other. When this takes place undesirable forces are imposed upon the rollers which may result in failure of the bearing or substantially reduce its service life. It is an object of the present invention to provide an improved keying arrangement, between the race ring segments, which is economical and which can be readily utilized to substantially avoid relative axial movement of the segments.

Race rings have been previously segmented by impact breaking them along substantially a diametrical plane but it is another object of this invention to provide a keying arrangement produced by an improved method of impact fracturing of the race ring.

This invention is incorporated in a race ring having generally radially extending openings adjacent a common diametrical plane and spaced approximately 180° apart to facilitate segmenting of the ring. The openings have, on one of the annular surfaces of the race ring, indentations which are disposed radially to the openings and communicate therewith. The indentations are transverse to the diametrical plane and are spaced from the point of tangency between the openings and the diametrical plane. The race ring is impact broken axially by applying a suitable force after positioning the ring in an anvil. The offset position of the openings with respect to the diametrical plane and the generally radial indentations causes the axial fracture to diverge from the diametrical plane, whereby one of the end portions is provided with a projecting portion while a receiving space is formed on the abutting portion.

When the race ring is assembled, the key thus provided by the projecting surface and the receiving space tends to restrict axial movement between the segments.

The foregoing and other objects of the invention, and the best mode in which I have contemplated applying such principles will more fully appear from the following description and accompanying drawings in illustration thereof.

In the drawings,
FIG. 1 is a side elevation, with parts broken away to show interior construction, illustrating the invention incorporated in a needle roller journal bearing;
FIG. 2 is a sectional view taken along the line 2—2 in FIG. 1;
FIG. 3 is a perspective, exploded view of the outer race ring illustrated in FIGS. 1 and 2;
FIG. 4 is an elevation illustrating the race ring prior to segmentation; and
FIGS. 5 and 6 are views taken along the lines 5—5 and 6—6 in FIG 4, after segmentation.

Referring to the drawings, the invention is illustrated embodied in a cylindrical needle roller journal bearing 10 comprising a tubular split outer race ring 12 surrounding a tubular, segmented cage 14, having suitable windows for receiving cylindrical needle rollers 16, and a portion of a shaft 18. As is known, in operation the movement of the rollers is epicycloidal, that is, they rotate about their longitudinal axes as the rollers also orbitally rotate.

The outer race ring 12 is provided with axially spaced, symmetrical integral radial ribs 20 and 21 defining annular, symmetrical end faces 22 and 23 and complementary annular, symmetrical inner faces 24 and 25 (FIG. 3) in a common cylindrical plane.

The rollers 16 contact an outer cylindrical raceway 28, formed between the ribs 20 and 21, and are supported by a cylindrical inner raceway 29 formed on the annular outer surface of the shaft 18.

The outer race ring 12 is formed by two arcuate, approximately semi-circular segments 30 and 31, the segment 30 having terminal irregular surfaces 32 and 33 and the segment 31 having terminal irregular surfaces 34 and 35. Central portions of the surfaces 33 and 34 project as at 36 and 37, respectively, and are recived in mating recesses 38 and 39, respectively, to form keyed connections when the segments are assembled in abutting relationship, FIGS. 5 and 6, opposite ends of the segments 30 and 31 each having a male or female half of the connection. Each segment 30 and 31, therefore, extends circumferentially more than 180° when measured from, for instance, the surface 32 to the tip of the projecting central portion 36. However, each segment measures substantially 180° when measured from, for instance, surface 32 to surface 33.

The recesses 38 and 39 are defined by two opposed irregular walls 45 and 46, respectively, which are generally radially disposed with respect to the two diametrically aligned opposed openings 50 and 51. The two projecting opposed surfaces 36 and 37 of each segment are irregular and complementary to the irregular walls 45 and 46. The openings 50 and 51 are themselves disposed on opposite sides of and tangent to the vertical diametrical plane at the inner cylindrical raceway 29, as illustrated in FIG. 4.

Thus, the two pairs of interlocking, abutting irregular walls 45 and 46 and the surfaces 36 and 37 tend to substantially avoid axial movement of the segments 30 and 31 relative to each other, since the segments 30 and 31 are retained against generally radial movement by a split, spring ring 40 disposed within an annular groove 41, FIGS. 2 and 3.

To form the outer race ring 12, a relatively soft piece of steel tubing is cut to the desired length and machined to form the illustrated inner and outer surfaces. The two radial circular openings 50 and 51 are then cut completely through the wall of the race ring, 180° apart from each other, on opposite sides of a common diametrical plane, and preferably midway between the end faces 22 and 23. The edges 60 and 61, formed by the intersection of the end faces 22 and 23 and the annular inner faces 24 and 25 are then punched or ground to form notches 64, 65, 66 and 67. The notches 64 and 65 are axially aligned and lie in the diametrical plane to which the opening 50 is tangent. Similarly, notches 66 and 67 are axially aligned and lie in the same diametrical plane as notches 64 and 65 but the notches 66 and 67 are 180° removed from the notches 64 and 65 and in line with the portion of the diametrical plane tangent to the opening 51.

The edges of the openings 50 and 51 adjacent the diametrical plane are each then punched or ground to form V-shaped notches 70 and 71 for the opening 50 and notches 72 and 73 for the opening 51, these notches being spaced equidistant from the point of tangency of the diametrical plane and the circular openings that is, from the medial plane of the race ring. The notches 70, 71 72 and 73 lie across the diametrical plane, communicate with the openings 50 and 51, and have their widest portions closest to the openings 50 and 51, as illustrated.

To split the ring 12 to form the keyed connections described, the outer race ring steel is then hardned by any suitable means. After hardening, the outer raceway is placed upon an anvil 80 of a punch press with the notches 64, 65, 66 and 67 vertically aligned, FIG. 4. The race ring 12 is then struck a hard impact blow with the punch 82, which splits the race ring longitudinally from the notch 64 to and through the notch 70 and through the notch 71 to the notch 65. Likewise, the ring 12 is simultaneously split from the notch 66 to and through the notches 72, 73 and 67. Because of the close proximity of the openings 50 and 51 to the fracture line, the line of fracture does not extend between the notches 70 and 71 nor between the notches 72 and 73, but rather the fracture (because of the radial alignment of the notches with respect to the openings 50 and 51) is detoured from following a diametrical, axial path and is diverted toward the openings 50 and 51, through the notches 70, 71, 72 and 73.

The notches 64, 65, 66 and 67 are of V-shape as illustrated in FIGS. 4, 5 and 6. Also, the notches 70, 71, 72 and 73 are of V-shape as illustrated in FIGS. 5 and 6, but additionally, as indicated in FIG. 3 for notch 70, each of these notches is of V-shape as to their depth. The line of fracture through the notches 70, 71, 72 and 73 will usually be through the bottom of the V-shape, that is, between the two lines representing these notches in FIGS. 5 and 6, but for clarity this additional line has been omitted in FIGS. 5 and 6.

Splitting the ring in the aforementioned manner results in the projecting irregular surfaces described and in the generally irregular terminal surfaces, so that the segments 30 and 31 can only be properly assembled when the surface 32 abuts the surface 34, at which time the surface 36 is received in the recess 38, etc. If the segments 30 and 31 are reversed relative to each other so that the surface 32 engages the surface 35, etc., the segments 30 and 31 will not form continuous cylindrical surfaces, the assembler immediately becoming aware of the fact that an incorrect assembly is being attempted whereupon he reverses the parts to assemble the segments correctly.

It is to be understood that the notches which are disposed radially to the openings 50 and 51 need not necessarily be made on both sides of the medial plane, as illustrated. For instance, if axial movement in one direction only need be restrained only one such notch on one side of the medial plane for each of the openings 50 and 51 need be provided. Also, by providing one notch for each of the openings 50 and 51, on opposite sides of the medial plane, movement in both axial directions would be restrained.

Also, the notches described are provided only on the inner cylindrical surfaces areas of the race ring since the inner surface areas, in the areas of impact and support (when the race ring is subjected to the impact of the punch 82) are under tension, whereas the outer cylindrical surface areas, in the areas of impact and support, are in compression, because the tension stresses tend to separate the ring.

In another method of fracturing the race ring, not illustrated, the ring is suitably supported and a split collar is inserted within the race ring, the line of juncture of the split collar coinciding generally with the diametrical line along which the race ring is to be generally split. The collar is provided with an opening into which a wedge is forcefully inserted for spreading apart the two halves of the collar and segmenting the race ring. In this instance, both the inner and outer surfaces, in the general area of the radial openings, are under tension and the notches may be placed on the inner and/or outer cylindrical surfaces, as desired.

To assemble the roller bearing, the segmented cage and its complement of rollers is first assembled to the shaft with which it will cooperate. The cage may or may not be provided with a keying arrangement between the segments to restrain relative axial movement between the cage segments, as desired. Thereafter, the outer segments are placed over the rollers by movement of the segments generally radially inward, so that the proper terminal surfaces abut, and the spring ring is then placed in the groove to retain the segments against radially outward movement.

Having described this invention, I claim:

In apparatus of the character described a two piece segmented race ring having side faces, the two race ring segments defining generally radial openings adjacent a diametrical plane, each of said openings communicating with generally radial indentations formed on an annular surface of said segments, said indentations being on the sides of the openings adjacent said diametrical plane but the indentations being to one side of the point at which said diametrical plane would be tangent to the openings, said segments having abutting, mating fractured irregular surfaces along a plane generally coincident with said diametrical plane extending from the side faces to said indentations and thence to said openings and defining keyed connections formed by projecting surfaces on opposite sides of the diametrical plane and on two end surfaces of said segments, said projecting surfaces being received by the other two surfaces of said segments, whereby axial movement of the segments relative to each other is minimized.

References Cited in the file of this patent

UNITED STATES PATENTS

| | | |
|---|---|---|
| 1,644,611 | Rieffert | Oct. 4, 1927 |
| 1,921,488 | Smith | Aug. 8, 1933 |
| 2,624,105 | Virtue | Jan. 6, 1953 |
| 2,624,645 | Virtue | Jan. 6, 1953 |
| 2,625,449 | Sutowski | Jan. 13, 1953 |
| 2,741,826 | Hall | Apr. 17, 1956 |